Oct. 2, 1928.
H. O. HEM
WEIGHING SCALE
Filed March 11, 1925
1,685,780
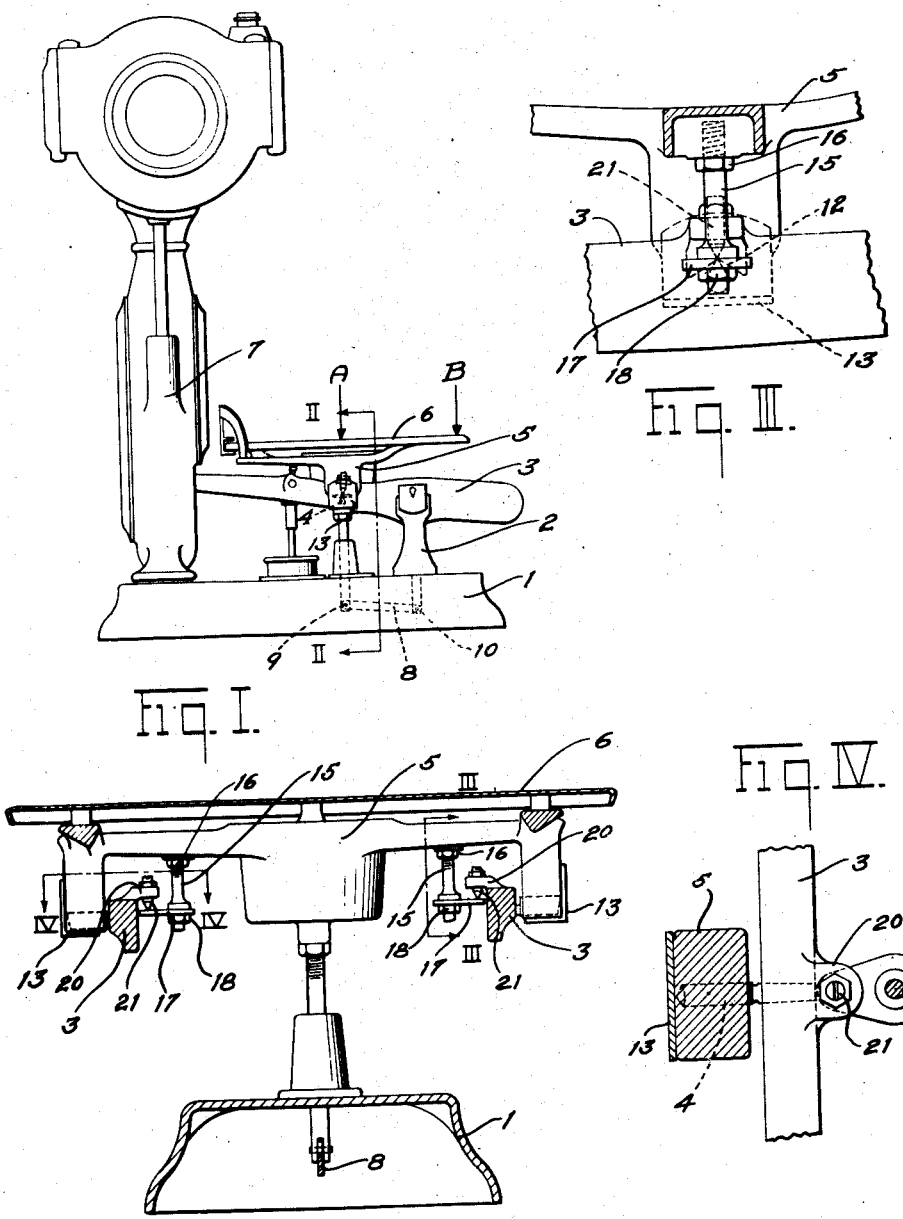
Inventor
Halvor O. Hem.
By C.O. Marshall,
Attorney Patented Oct. 2, 1928.

1,685,780

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed March 11, 1925. Serial No. 14,771.

This invention relates to weighing scales, and more particularly to devices for preventing derangement of the knife edge pivots in their bearings.

It is one of the principal objects of this invention to provide a simple and effective means for preventing derangement of the pivots and bearings in weighing scales.

Another object is the provision of means for preventing the derangement of the pivots and bearings, which means may be adjusted to compensate for any inaccuracies in the manufacture of the scale parts.

Still another object is the provision of a device for preventing derangement of certain elements of a weighing scale which is simple and inexpensive to manufacture and which may be incorporated in scales of known types without effecting changes in the design thereof.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale of a well known type embodying my invention;

Figure II is a vertical transverse sectional view through a portion of the scale taken substantially on the line II—II of Figure I;

Figure III is an enlarged fragmentary sectional view of a portion of the scale taken substantially on the line III—III of Figure I, showing the platform retaining means of my invention; and Figure IV is a top plan view, partly in section, of a portion of the scale showing the platform retaining means.

Referring to the drawings in detail, I have illustrated the device of my invention as incorporated in a scale of the counter type, but it is to be understood that it may be employed wherever its use may be found desirable. The scale comprises substantially a base 1 supporting at one end thereof a fulcrum stand 2 which supports the main lever 3, the lever being provided with lever pivots 4 adapted to support a spider 5 upon which is superimposed a commodity receiving platform 6. The nose end of the lever projects into a housing 7 erected upon the base 1, and is suitably connected to a pendulum load-counterbalancing and indicating mechanism. The platform is prevented from tipping when a load is placed on the edge thereof by means of a link 8 pivotally secured at points 9 and 10 to a spider stem 11 and a post 12 fixed to the base.

In the operation of the scale a load to be weighed may be placed upon the platform 6, causing the lever 3 to be moved downwardly and move the pendulum mechanism (not shown) to a position to counterbalance the load. It will be apparent that if the load be placed upon the platform in the position indicated at A it will be directly over the pivots 4, and if the other moving parts are correctly adjusted the indication of the load will be accurate. If, however, the load—i. e., a comparatively heavy load substantially equivalent to the capacity of the scale—be placed in the position indicated at B, the tendency of the platform structure is to shift its position in a clockwise direction about the pintle 9, the latter acting as a fulcrum. The platform supporting spider is provided with V-shaped bearings 12, preferably of agate. The apices of the V grooves of the bearings normally engage the knife edges of the pivots 4, but with the load in position B the platform and bearings 12 are shifted from their normal positions relative to the pivots 4, thus bringing the rounded sides of the pivots 4 into engagement with the thrust plates 13 and virtually changing the point of engagement of the load with the lever, which condition would cause an inaccurate indication of the weight, and in addition a certain amount of friction would be set up which would also vitally affect the accuracy of the scale. I have provided simple and effective means for obviating these difficulties, which means will now be described.

The laterally extending arms of the spider 5 are provided with threaded studs 15 fixedly retained in the arms by means of lock nuts 16, the depending portions of said studs adapted to receive the plates 17 retained in place by means of nuts 18. The lever 3 is provided with integral inwardly projecting bosses 20 having threaded apertures therein adapted to receive cone pointed screws 21.

The studs 15 are so adjusted that the upper surfaces of the plates 17 are coincident with a substantially horizontal plane passing through the apices or edges of the pivots 4 and the screws 21 are adjusted so as to bring the cone points thereof into slight contact with the upper surfaces of the plates 17, as particularly illustrated in Figure II. As the points of the screws 21 lie in a line coincident with the edges of the pivots 4 the parts are free to move in their normal loci but the bearings retained in the spider 5 are prevented from abnormal displacement relative to said pivots no matter in what position the load may be placed upon the platform.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a member having a knife edge pivot, a member having a bearing engaging said pivot, and means for preventing derangement of said pivot and bearing, said means including a cone pivot carried by the member having said knife edge pivot, and means for adjusting said cone pivot to bring its apex into alignment with the apex of said knife edge pivot.

2. In a weighing scale, in combination, a lever having pivots, a platform structure supported on said pivots, a boss on said lever, a bearing plate carried by said platform structure, and a cone pivot adjustably supported in said boss and adapted to be brought into engagement with said bearing plate to prevent displacement of said platform on said pivots.

3. In a weighing scale, in combination, a lever having pivots, a platform supported on said pivots, an auxiliary bearing plate adjustably carried by said platform, and a cone pivot adjustably supported in said lever and adapted to normally engage said auxiliary bearing plate to prevent abnormal displacement of said platform.

4. In a device of the class described, in combination, a member having a knife edge pivot, a member having a bearing engaging said pivot, and means for preventing derangement of said pivot and bearing, said means including a cone pivot having its apex directed oppositely to the apex of said knife edge pivot, and means for adjusting said cone pivot to bring its apex into alignment with the apex of said knife edge pivot.

5. In a weighing scale, in combination, a lever having knife edge load pivots, a platform structure having bearings engaging said load pivots, a cone pivot carried by said lever, a bearing plate carried by said platform structure, and means for adjusting said cone pivot and bearing plate to bring the cone pivot and bearing plate to bring the apex of said cone pivot into engagement with said bearing plate with the point of engagement substantially in line with the apices of said knife edge pivots.

HALVOR O. HEM.